March 5, 1974     H. DAHMS     3,795,589
METHODS FOR ELECTROCHEMICAL ANALYSIS
Filed Nov. 30, 1970     2 Sheets-Sheet 1

INVENTOR.
HARALD DAHMS
BY Abner Sheffer
ATTORNEY

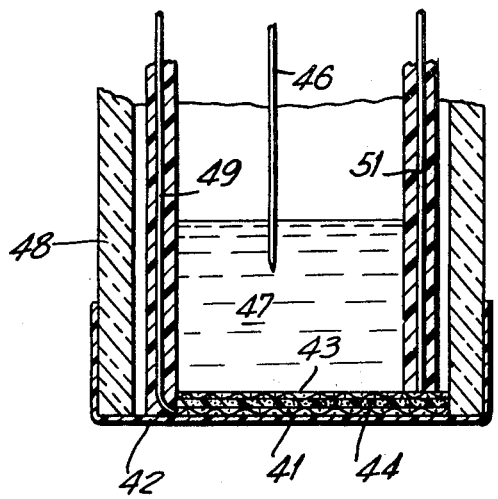
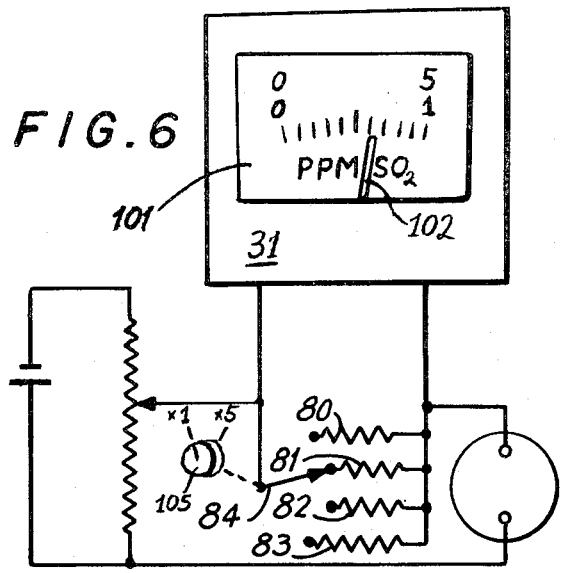
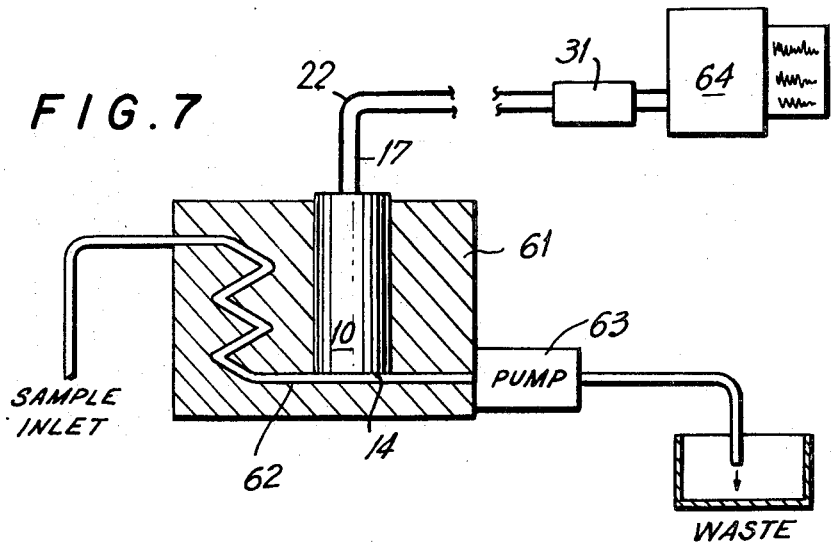
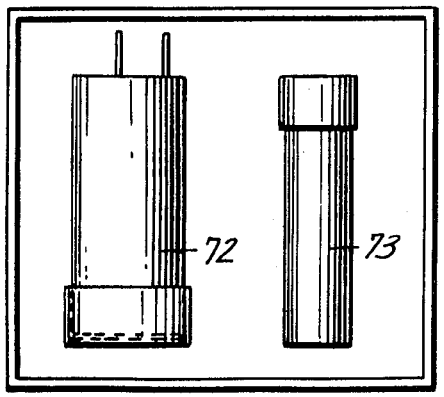
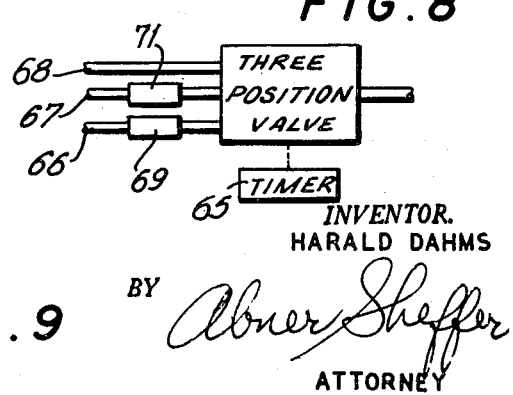
INVENTOR.
HARALD DAHMS

United States Patent Office 3,795,589
Patented Mar. 5, 1974

3,795,589
METHODS FOR ELECTROCHEMICAL ANALYSIS
Harald Dahms, 22 Lakeview Road,
Ossining, N.Y. 10562
Continuation-in-part of abandoned applications Ser. No. 718,032, Apr. 2, 1968, and Ser. No. 841,745, July 15, 1969. This application Nov. 30, 1970, Ser. No. 93,753
Int. Cl. G01n 27/46
U.S. Cl. 204—1 T
17 Claims

ABSTRACT OF THE DISCLOSURE

A measuring cell for determining the concentration of a selected component (e.g. $SO_2$, CO, $NO_2$, $O_3$, $H_2O_2$ or ethanol) in a mixture. The cell includes an electrode covered with a thin layer of electrolyte containing a redox system (e.g. $Cu^{++}$ for $SO_2$ measurement) which reacts with the selected component to form an electroactive species. At the electrode the electroactive species thus formed gains or loses electrons, giving a current which is a measure of the concentration of the selected component.

---

This application is a continuation-in-part of my applications Ser. Nos. 718,032, filed Apr. 2, 1968, now abandoned, and 841,745, filed July 15, 1969, now abandoned, whose entire disclosures are incorporated herein by reference.

For a number of years wide use has been made of an electrochemical sensor for the measurement of oxygen concentrations. This device consists essentially of a measuring cell having two electrodes connected through an electrolytic solution and separated from the mixture to be analyzed by a gas-permeable membrane which overlies one of the electrodes (the cathode). The oxygen permeates the membrane and is reduced at the cathode according to the equation: $O_2 + 4e + 2H_2O = 4OH^-$. The electric current due to this reduction is measured and gives an indication of oxygen concentration.

Simple sensors for such constituents as $SO_2$, $NO_2$, $O_3$, CO as well as organic compounds such as alcohols are urgently needed, especially in monitoring of air pollution and in other medical and industrial applications. Furthermore there is an often expressed need in air monitoring for portable, inexpensive equipment. Despite this, the usefulness of the electrochemical sensors of the type described above has been practically limited to analyses for oxygen concentration. Most other constituents are either inactive or give erratic results in contact with devices of this type.

One aspect of the present invention provides electrochemical sensors for measuring the concentrations of a wide variety of species with high sensitivity, selectivity and reproducibility.

According to one aspect of this invention the concentration of a selected constituent of a mixture is measured by bringing the mixture to be analyzed into contact with a measuring cell having an electrode carrying a thin layer of an electrolyte containing a reversible redox system, in one state of oxidation, which reacts with the selected constituent to form an electroactive species in another state of oxidation. This electroactive species is active at the electrode where it is reconverted, by electron transfer, to the first state of oxidation. The rate at which this electron transfer occurs depends on the concentration of the constituent, and that rate corresponds to the flow of current at the electrode, which current can be easily measured.

For the determination of $SO_2$ the electrolyte (or "electrode liquid") is preferably an aqueous solution containing $Cu^{++}$ or $Fe^{+++}$. This varivalent metal ion may be present in uncomplexed state or as a complex such as $Fe(o\text{-phenanthroline})_3^{+++}$. Where $Fe^{+++}$ is used the reaction converting $SO_2$ to an electroactive species may be $$SO_2 + 2Fe^{+++} + H_2O \rightarrow 2Fe^{++} + H_2SO_4 + 2H^+$$

while the reaction at the electrode (anode) to reconvert the redox system to its original state of oxidation may be $2Fe^{++} - 2e \rightarrow 2Fe^{+++}$. A wide variety of anions may be present e.g. $NO_3^-$, $Cl^-$, $ClO_4^-$, $SO_4^=$. Where $Cu^{++}$ is used the conversion reaction may be $$SO_2 + 2Cu^{++} + H_2O \rightarrow 2Cu^+ + H_2SO_4 + 2H^+$$

while the electrode reaction may be $2Cu^+ - 2e \rightarrow 2Cu^{++}$. It is preferred to have present some chloride (or bromide) ions in this copper-containing system so that $Cu^+$ ions formed in the reaction may be in the form of $CuCl_2^-$ for example.

For the determination of CO the electrode liquid is preferably an aqueous solution containing $Pd^{++}$ such as an acidic solution thereof. Thus, the conversion reaction may be $CO + Pd^{++} + H_2O \rightarrow Pd + CO_2 + 2H^+$ while the electrode reaction (at the anode) may be $Pd - 2e \rightarrow Pd^{++}$. Typically the amount of $CO_2$ produced by the reaction will be extremely small in relation to the amount of liquid and it is dissolved therein.

For the determination of ammonia the electrode liquid is preferably an aqueous solution containing $OBr^-$. Thus, the conversion reaction may be $$2NH_3 + 3OBr^- \rightarrow 3Br^- + N_2 + 3H_2O$$

while the electrode reaction (at the anode) may be $$3Br^- - 6e + 3H_2O \rightarrow 3OBr^- + 6H^+.$$

Typically the amount of $N_2$ produced by the reaction is quite small in the relation to the amount of liquid and the nitrogen dissolves in the liquid without interferring with the operation. It is desirable to use an alkaline liquid (e.g. one buffered with bicarbonate to an alkaline pH of about 8–9; this minimizes absorption of $CO_2$ from the atmosphere at more alkaline pH). The cation is preferably an alkali metal (e.g. $K^+$, $Na^+$, $Li^+$) or other cation which does not oxidize or reduce $OBr^-$.

For the determination of $NO_2$ and total oxidants (such as $O_3$) the electrode liquid is preferably an aqueous solution containing $I^-$. Thus the conversion reaction may be $NO_2 + 2I^- + 2H^+ \rightarrow I_2 + NO + H_2O$ while the electrode reaction (at the cathode) may be $I_2 + 2e \rightarrow 2I^-$. The use of an alkaline solution (e.g. one at pH 7.4) promotes the reversibility of the effect. Also, I have found that the simple buffered KI solution is not responsive to ozone, but responds selectively to $NO_2$. By the inclusion of a molybdate, e.g. $(NH_4)_6Mo_7O_{24}$ (a catalyst known for the oxidation of $I^-$ by $H_2O_2$), in the liquid the device becomes responsive to $O_3$ also. Thus, both $NO_2$ and "oxidants" other than $NO_2$ can be measured by using two devices, in one of which the liquid is the simple KI solution and in the other of which the liquid also contains the molybdate, and making the appropriate substraction of the measured $NO_2$ content from the total oxidants content to get the amount of ozone and other oxidants other than $NO_2$.

$H_2O_2$ concentrations (in water for example) may be measured by the use of a cell containing $I^-$ and a catalyst for the oxidation of $I^-$ by $H_2O_2$, e.g. $(N_4)_6Mo_7O_{24}$.

For the determination of ethanol the liquid is preferably an aqueous solution containing $Cr^{6+}$, which may be present in a dimeric form $(Cr_2O_7^=)$ or other polymeric form. Thus, the conversion reaction is $$Cr^{6+} + C_2H_5OH \rightarrow Cr^{3+} + \text{oxidation products}$$

(possibly aldehydes or $CO_2$), while the electrode reaction is $Cr^{3+} - 3e \rightarrow Cr^{6+}$.

In the practice of my invention I may use a redox system having plurality of redox agents one of which is converted to a different state of oxidation (i.e. oxidized or reduced) by the constituent to be measured and the other of which reacts to return the first mentioned agent to its original oxidation state. One such double oxidation system, which is particularly suitable for measuring carbon monoxide, comprises $Pd^{++}$ and a redox agent (such as a varivalent metal ion) which serves to maintain the $Pd^{++}$ in its oxidized state and thus acts as a "carrier." The reactions are believed to be as follows:

Conversion: $CO+Pd^{++}+H_2O \rightarrow Pd+CO_2+2H^+$
Intermediate (carrier) reaction:

$$Pd+2Cu^{++} \rightarrow Pd^{++}+2Cu^+$$

Electrode reaction: $2Cu^+ - 2e \rightarrow 2Cu^{++}$ and, partly, $Pd - 2e \rightarrow Pd^{++}$.

In a preferred embodiment the electrode liquid is confined by a membrane and the mixture to be analyzed is brought into effective contact with the outer surface of the membrane. To provide a geometrically well-defined layer of electrode liquid on the electrode I preferably employ a porous spacer. The spacer may be for example, a woven, knitted or felted or other non-woven fabric of nylon or other polymer fiber (e.g. of a fluoroethylene polymer such as Teflon, polytetrafluoroethylene) or of glass fiber or other inorganic fiber, resistant to the action of the electrode liquid. The spacing may also be effected by attaching materials such as fibers or powders of glass or other resistant materials to the surface of the electrode, or even by roughening the surface of the electrode. The thickness of the layer of electrode liquid is preferably less than 3 mm., more preferably below 1 mm., e.g. 0.04 mm.

The electrode surface may be of noble metal (e.g. platinum or gold) or of other corrosion-resistant material such as graphite.

The membrane may be of highly permeable material such as silicone rubber, e.g. a substantially ion-impermeable membrane, about 0.05 mm. in thickness and free of holes, of silicone rubber which has the following permeability rates (expressed as cc. of gas per second, passing through a membrane under a pressure difference of 1 cm. of Hg per centimeter thickness of membrane): $N_2$, $25 \times 10^{-9}$; He, $32 \times 10^{-9}$; $O_2$, $54 \times 10^{-9}$; $H_2$, $60 \times 10^{-9}$; $CO_2$, $288 \times 10^{-9}$; $H_2O$, $3200 \times 10^{-9}$; $CH_4$, $85 \times 10^{-9}$; $C_4H_{10}$, $800 \times 10^{-9}$. Another suitable membrane is of Teflon (polytetrafluoroethylene), such as the 0.025 mm. membrane supplied by Radiometer Company of Copenhagen, Denmark; this membrane is considerably less permeable than the silicone rubber membrane. Still other membranes are of fluorosilicones, for example. It is often desirable to match the membrane to the particular electrode liquid and the general concentration of the component to be measured. Thus, if the membrane is highly permeable and the concentration of the component to be measured is high and the reaction of the permeating material with the electrode liquid is slow, the concentration of the component in the electrode liquid may build up, leading to slow response; this can be avoided by using less permeable membranes (such as thicker membranes, membranes of less permeable material or both) or by increasing the reaction rate (as by raising the temperature or the concentration of the redox system in the electrode liquid). Also when the concentration of the component to be measured is high the amount of current flowing may be reduced by using a less permeable membrane. It will be understood that the permeability of the membrane may be reduced not only by replacing the membrane with a less permeable one but also by coating the membrane or simply by covering it with a second membrane.

It is also within the broader scope of the invention to retain the thin layer of electrode liquid on the electrode without using a membrane. A porous spacer can retain the liquid simply by capillary action, with fresh liquid penetrating along the spacer from a counter-electrode compartment to replace liquid lost by evaporation or by leakage. The structure of the electrode may be also relied upon to retain this layer without using a spacer; for example, one may use a liquid-retaining wire gauze electrode having a surface of appropriate wetting characteristics. The thickness of the layer need not be uniform and the layer need not be continuous. It is desirable, however, that the dimensions of the layer do not change during the test period. Loss of water by evaporation from the film of electrode may be reduced, when necessary, by using the device in a wholly or partially saturated atmosphere (e.g. by adding water vapor to the sample to be tested) or by reducing the water vapor pressure in the electrode liquid by suitable additions or replacing part or all of the water in that liquid by less volatile liquids.

For most purposes the area of the layer of electrode liquid on the electrode will be in the range of about 1 mm.$^2$ to 500 mm.$^2$, and this layer and the face of the electrode will be coextensive. The use of larger effective areas of electrode liquid will generally give a higher ratio of response current to background current.

The preferred, and simplest means of measuring the amount of electroactive species produced by the conversion reaction is to apply a steady predetermined voltage to the electrodes and to measure the current. However, one may also apply the voltage intermittently; for example one may apply the voltage for a short period such as 10 seconds, after exposing the cell to the mixture to be tested for a longer period (such as one minute) during which no voltage is applied to the electrodes. In the latter case the current will be higher than when the measurement is made at a constantly applied voltage of the same numerical value. The variation need not be stepwise but can be in any predetermined pattern. In any case, the numerical value of the current at a predetermined time during the application of the voltage will give a comparable (and calibratable) indication of the concentration of the selected component in the mixture being tested. Instead of measuring an instantaneous value of current, one may measure an integrated value of the current over a given time during its flow, in well-known manner, e.g. mechanically, electronically (by integrating operational amplifiers) etc.

Preferably the voltage between the counter-electrode and the electrode carrying the layer of redox material is at least 10 mv. and is not so great as to cause electrolytic decompositions of the water or other medium. For example, when an acidic aqueous $Fe^{+++}$ redox system is used having a redox potential of around 1 volt, the applied voltage will be below about 0.8 v. so as to reach the 1.8 v. figure at which substantial decomposition of the water occurs. When the $Cu^{++}$ redox system is used, having a somewhat lower redox potential, the range of the upper limit of voltage is correspondingly higher. The applied voltage can be furnished by an external source (such as a battery) or may be furnished entirely internally by choice of an appropriate counter-electrode material which forms part of a galvanic cell with the electrode liquid.

When the electrode carrying the thin layer of electrode liquid is the cathode the voltage between it and the counter-electrode is generally well below that at which oxygen would (as in the conventional oxygen electrode discussed at the beginning of this specification) be reduced at a substantial rate; that is the voltage I generally employ is such as to give a rate of reduction of oxygen equivalent to a current less than one microampere per square centimeter of electrode surface and preferably much less than this value (e.g. 1/10 or 1/100 of this value). For instance, in a typical operation in which the layer-covered electrode is the cathode and the redox system contains $I^-$ at a redox potential of about +200 mv., the applied voltage is well below 400 mv. and generally below 300 mv., e.g. about 200 mv. or less so that the potential of the cathode, as referred to a standard hydrogen electrode is more positive than −200 mv., generally more positive than −100 mv. e.g. about 0 mv. Of course, for a redox system having a more positive redox potential higher voltages may be employed without danger of interference from oxygen present in the mixture being analyzed. It will be understood that these precautions apply only when the mixture being analyzed contains significant amounts of $O_2$. Another way of avoiding possible interference from oxygen is to measure the oxygen concentration separately (as by means of a conventional cell, as previously mentioned) and to subtract the response attributable to oxygen from the total response, after suitable calibration.

In the drawings which illustrate certain forms of the invention.

FIG. 5 is a schematic view, in elevation and partly in cross section, of another form of measuring cell using a guard electrode.

FIG. 6 is another circuit diagram for use with the measuring cell of FIG. 1.

FIG. 7 is a schematic view, in elevation and partly in cross section, of an arrangement for bringing the measuring cell into operative association with the sample to be analyzed.

FIG. 8 is a schematic view of an arrangement for providing calibrating fluids and samples for use in the measuring cell.

FIG. 9 is a schematic view of a kit containing a measuring cell structure in dry condition and an electrolyte for use therein.

DETAILED DESCRIPTION OF THE PREFERRED EMBODIMENTS

Figure 1:
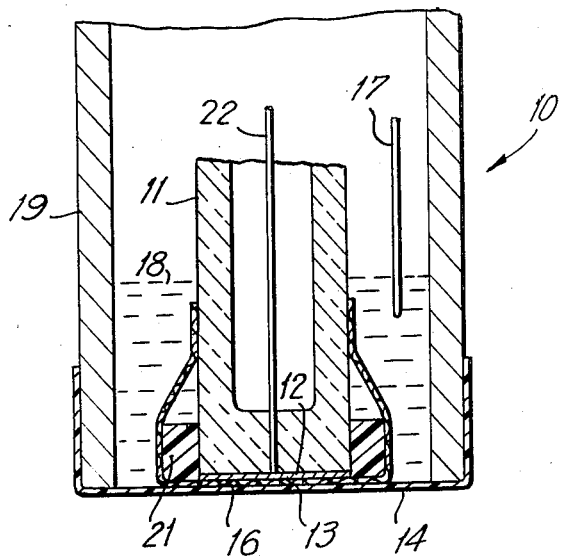
FIG. 1 is a schematic view, in elevation and partly in cross section, of a measuring cell of this invention.

The structure 10 of FIG. 1 comprises an insulating rod 11 having at the bottom thereof an electrode 12 which is in contact with a thin layer 13 of liquid supported by a membrane 14 which is permeable to the component whose concentration is to be determined. The membrane 14 is spaced uniformly a short distance from the electrode 12 in any suitable manner such as by means of a porous layer of inert fabric 16 or other fibrous material. A counter-electrode 17 is situated within a body 18 of the same liquid contained within an insulated outer casing 19, at the lower end of which the membrane 14 is supported. To lengthen the diffusion path between the thin layer 13 of liquid and the main body 18 of that liquid an insulating spacer 21 is mounted around the rod 11. A wire lead 22 runs through the rod 11 into electrical contact with the electrode 12.

Figure 2:
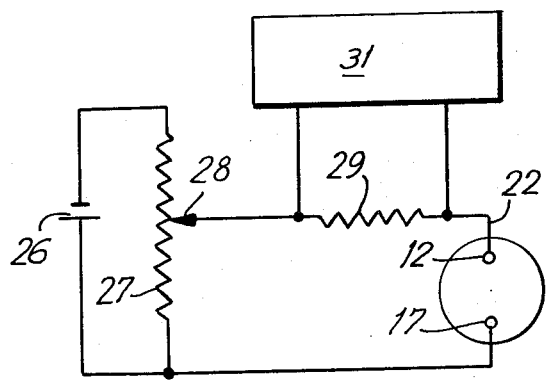
FIG. 2 is a diagram of an electrical circuit to be used with the measuring cell.

As shown in FIG. 2, a substantially constant voltage is supplied between the electrode 12 and the counter electrode 17, as by means of a circuit containing a storage battery 26 and a resistor 27 having an adjustable contact 28. The current that flows through the electrodes is measured in any suitable manner; e.g. this current also passes through a small fixed resistor 29 and the resulting IR drop across the resistor 29 is measured by a conventional meter 31 (e.g. a high impedance millivolt meter) which serves as a sensitive galvanometer.

Figure 3:
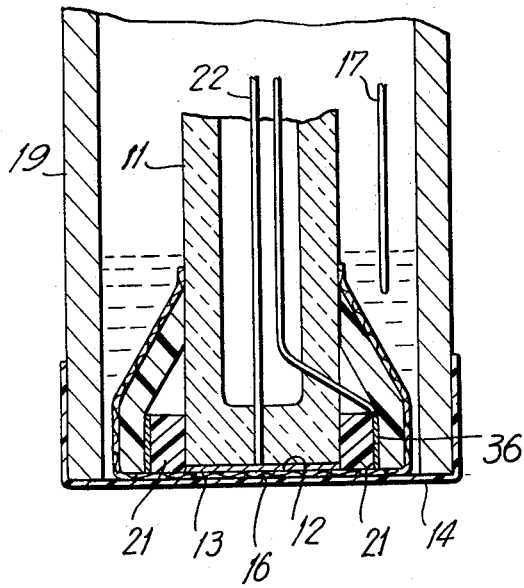
FIG. 3 is a schematic view, in elevation and partly in cross section, of an improved measuring cell having a "guard" electrode.
Figure 4:
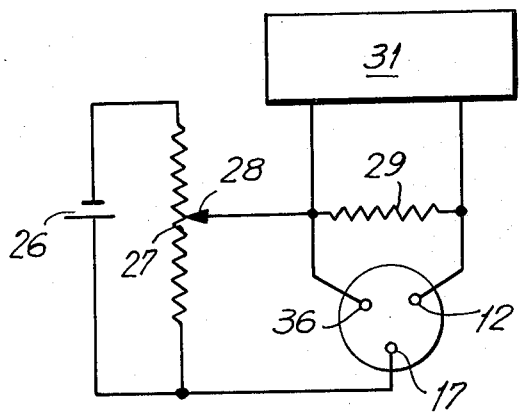
FIG. 4 is a diagram of an electrical circuit to be used with the measuring cell of FIG. 3.

I have found that the use of a third electrode as illustrated in FIGS. 3 and 4 decreases the background current of the device, possibly by reducing diffusion between the two electrodes. In the structure shown in FIGS. 3 and 4 the arrangement of the electrode 12 and counter-electrode 17, etc., is similar to that of FIG. 1. A third electrode 36 is placed between the electrode 12 and the counter electrode 17 and is maintained at about the same potential as the electrode 12, as (see FIG. 4) by connecting the third electrode 36 on one side of the small resistor 29 so that the current flowing between the third electrode and the counter-electrode does not pass through the resistor 29 and thus does not affect the reading of meter 31. It will be understood that in the preferred embodiment the IR drop across resistor 29 is only a small fraction (e.g. 1%) of the voltage between electrodes 12 and 17 and that the voltage between electrodes 26 and 17 is therefore substantially the same as that between electrodes 12 and 17. The third electrode 36 is situated so that species diffusing between the counter-electrode 17 and the electrode 12 have to pass over it. In FIG. 3 it is in the form of a cylinder (which may be a piece of noble metal foil, e.g. of platinum or gold, wrapped around the insulating ring 21) which is protected by an insulated collar, so that only the thin lower edge of this cylinder is in contact with the liquid; by limiting the contact to the thin circular line of that lower edge the current flowing through the third electrode is reduced and unduly large currents are avoided.

FIG. 5 illustrates another physical arrangement, employing a third electrode, particularly designed for use when there is a high rate of transport of the liquid toward the electrode which is close to the membrane. In this arrangement the first electrode 41 is a fine platinum wire mesh resting on the membrane 42. Spaced a little above this first electrode is another fine platinum wire mesh 43 which serves as the third electrode; it is kept away from direct electrical contact with the first electrode 41, by means of a spacer which may be a fine porous gauze 44 of inert plastic or glass. This assembly, together with the counter-electrode 46, is immersed in the liquid 47, e.g. in a tubular insulating container 48. The first and third electrodes 41 and 43 are connected to the external circuit (which may be identical with that shown in FIG. 3) by means of electrically insulated wire leads 49 and 51, respectively. This type of arrangement also helps to prevent the membrane from running dry when operated at high temperatures at which there is an increased loss of water through the membrane (the water being lost as vapor from the underside of the membrane).

The utility of the third electrode is not limited to use with the novel electrode liquid systems described herein. It may also be employed in the conventional oxygen-measuring electrode system such as that shown in Clark U.S. Pat. 2,913,386.

In the initial operation of the measuring devices the background current (i.e. the current flowing when the device is exposed to an environment, such as pure air, substantially free of the constituent which it is intended to measure) is often at first (e.g. after a few hours) relatively large and decreases over a period of time (e.g. 3 days) to a much lower level, which may be, for instance, about one-tenth or one-hundredth of the initial current. I believe this to be due to an "auto-purification" of the electrode liquid owing to the flow of the background current. Thus when a liquid containing $Fe^{+++}$ ions is employed there will usually be present, initially, a few $Fe^{++}$ ions which will be oxidized to $Fe^{+++}$ by the background current flow. As the $Fe^{++}$ ions in the electrode liquid are used up, the background current decreases until the background current stabilizes at the lower level mentioned above. At this time the background current may be due in part to the diffusion of electroactive species such as $Fe^{++}$ ions from the main body of liquid into the thin layer adjacent the electrode. When the third electrode (or "guard electrode") is used these diffusing electroactive species are intercepted and oxidized (or reduced, as the case may be) to the same oxidation state that predominates near the center electrode so that they cannot carry their charge from the counter-electrode zone to the center electrode; thus the background current is reduced still further. This interception, I believe, improves the purity, in terms of freedom from electroactive species, of the thin layer of liquid adjacent the electrode and by reducing the background current portion of the overall response makes the system more sensitive to the component to be measured (e.g. more sensitive to those $Fe^{++}$ ions which result from reaction of $Fe^{+++}$ and $SO_2$ and therefore more sensitive to $SO_2$).

The measuring device is desirably employed in an apparatus containing means for transporting the sample into contact with the outer (non-electrode) side of the membrane and means for maintaining the sample and the measuring device at a predetermined temperature. Means for discharging the sample and for calibrating the device may also be provided. Thus, in the apparatus shown in FIG. 7, which is particularly designed for the measurement of the alcohol content of a liquid, there is a constant temperature zone such as a heated metal block 61 whose temperature is controlled by a thermostat. There is also a passageway 62 for the sample (and any blanks and standards which may be employed) and a pump 63 for transporting these fluids through the passageway. One portion of a wall of the passageway 62 is formed by the membrane 14 of the measuring device 10 which is situated in a cavity in the block 61. The current measuring device (e.g. a high impedance millivolt meter 31) may be connected to a strip recorder 64.

In use, readings of the current may be made with water in the passageway, and with a fluid of known alcohol content. After such calibration, which may include recording the respective current values as lines on the strip chart recorder the sample of blood or beverage of unknown alcohol content is introduced into the passageway and the value of current similarly recorded.

A similar device can be used for continuous monitoring of contaminants in air. Here the pump 63 may be driven continuously at a constant rate. Calibration can occur automatically at predetermined times by the use of an arrangement shown in FIG. 8. Here an automatic timer 65 controls a three-position valve having three inlets (66, 67 and 68) and discharging into passageway 62 of FIG. 7. One inlet has a filter 69 for removing the selected contaminant from the atmospheric air drawn through the filter by the action of the pump; for $SO_2$ a well-known alkaline filter may be used, while for CO a Hopcalit filter may be employed, etc. The second inlet 67 is connected to a controlled source 71 of the contaminant, such as a permeation tube of the type described by B. E. Saltzman in Environmental Science and Technology, 2, 23 (1968) which releases the contaminant at a predetermined constant rate so that when the air flow is maintained at a known constant rate there is a predetermined known concentration of the contaminant in the air supplied to the membrane 14 through passageway 62. Thus a plastic permeation tube containing $SO_2$ which releases that gas at a rate determined to the pump rate may be employed. The third inlet is open to the atmosphere. Thus the cycle of operation may be to operate the valve at suitable intervals to connect first inlet 66 and then inlet 67 to the passageway 62 to calibrate the apparatus and then to return the valve to its usual position in which air is drawn through inlet 68 continuously most of the time, or intermittently, the pump being controlled by the timer or by remote control, etc. It will be understood that other sources of gas for calibration may be connected to inlets 66 and 67, e.g. gas cylinders containing pure air and air contaminated with a fixed amount of $SO_2$. For analyses in which two different components each have an effect on the measuring cell (e.g. $SO_2$ and CO on a cell having an electrode liquid containing a palladous chloride-cupric chloride double redox system) a suitable filter, or plurality of filters, may be placed in the passageway leading to the messuring device. For example, there may be an alkaline filter to remove $SO_2$ so that the device measures only CO concentration; the alkaline filter may then be by-passed so that the same measuring device gives a new reading from which the total amount of CO and $SO_2$ (and therefore the amount of $SO_2$ as such) can be determined.

No special counter-electrode construction is needed in the practice of my invention. The counter-electrode may be simply of bare corrosion-resistant metal, such as platinum or silver wire. In the preferred forms of this invention the potential at the counter-electrode is always well defined because of the presence of species of the redox system which are electroactive at the counter-electrode. For example, in $SO_2$ analysis, using $Fe^{+++}$ as the redox system, the liquid at the cathodic counter-electrode contains a large number of $Fe^{+++}$ ions which react at that counter-electrode as follows:

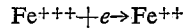

$$Fe^{+++}+e \rightarrow Fe^{++}$$

The measuring cells of this invention may be supplied to analysts in "dry" or "wet" form. In the wet form the electrode spacer-membrane-counter electrode assembly has the desired redox-containing electrode liquid in contact with the electrodes. In the dry form this liquid is not in such contact, but is to be added, when needed, to the assembly. In the latter case it is convenient to supply a kit which may be a box (see FIG. 9), or other container, or other support (e.g. a card) carrying the assembly 72 and also carrying a bottle 73, or other container, of the electrode liquid. An instrument for transferring the liquid to the assembly may also be included in the kit together with containers for other electrode liquids to be substituted in the same assembly.

As shown in FIG. 6 another circuit employs a set of resistors 80, 81, 82, 83 of different resistance values and a switch 84 for selectively including any one of these resistors in the circuit. The IR drop across the selected resistor is sensed and amplified by a suitable device 31, which may be any conventional stable high impedance amplifier. Preferably one selects the appropriate resistor in the light of the expected current so as to insure that this IR drop is small, most preferably in the range of 10 mv. or less.

The following examples are given to illustrate some aspects of this invention. In all the examples room temperature (about 22° C.) was used and the pressure was atmospheric, unless otherwise noted.

EXAMPLE 1

In this example, the electrode was constructed by heat-sealing a short piece of platinum wire 22 in the lower end of a piece of glass tubing which served as the rod 11. The glass at the closed, sealed end of the tubing was then ground plane and a solution containing $PtCl_4$ in acetone (e.g. 0.1 g. $PtCl_4$ per ml. of acetone) was applied to that ground end which was then exposed to moderate heat over a conventional Bunsen burner to decompose the platinum compound, forming a thin layer of metallic platinum. The resulting electrode was then brought to red heat to insure good adhesion of the platinum to the glass. The resulting thin circular platinum electrode had a diameter of 7 mm. A close-fitting cylindrical sleeve of Teflon (polytetrafluorethylene) serving as the spacer 21, was then placed over the lower end of the glass tube so that the lower edge of that ring is in the same plane as the thin platinum electrode. The outer diameter of this ring was 8.5 mm.. A piece of thin ordinary knit sheer nylon ladies hosiery material (e.g. knit 45 denier nylon), serving as the spacer 16, was then fixed over the electrode and the Teflon ring and was held on the rod (e.g. by a rubber band or other holding device). The resulting assembly was then placed in the cylindrical glass outer tube 19 (whose inner diameter was 10 mm.) with the assembly pressed lightly against the membrane 14 at the bottom of the paltinum electrode; the distance between the electrode and the membrane was determined by the thickness of the knit nylon spacer 16 which was about 0.04 mm. The membrane 14 was of silicone rubber (supplied by General Electric Co.) about 0.05 mm. in thickness. The membrane was held taut across the bottom of the outer tube 19 by suitable holding device such as a band. Suitable spacers may be present to help support and center the rod and the electrode 12 carried thereby, within the outer casing. The counter electrode was a platinum wire of 0.5 mm. diameter (immersed for about 2 cm. in the liquid and having its lower end about 8 mm. above the level of the platinum electrode.

(A) For measuring $SO_2$ concentrations in air the liquid was an aqueous solution containing $H_2SO_4$ at 0.2 M concentration and $Fe(NO_3)_3$ at 0.5 M concentration, the voltage between the center electrode and the counter electrode was maintained at 250 mv., with the center (platinum) electrode being the anode. A 4.4 megohm resistor 29 was used. After 3 hours of operating the device in room air (of very low $SO_2$ content), the background current was $6.5 \times 10^{-9}$ ampere. The device was then exposed successively to air containing increasing amounts of $SO_2$, the concentration of $SO_2$ being increased stepwise over the range of up to 5 v.p.m. $SO_2$ (i.e. up to 5 volumes of $SO_2$ per million volumes of air). The increase in electrode current was substantially linearly proportional to the increase in $SO_2$ concentration (about $1 \times 10^{-9}$ amp per v.p.m. $SO_2$). In each case the response time (here defined as the time period for the current to reach at least 95% of its final value, at each concentration of $SO_2$) was below one minute. The device acted reversibly; thus, on exposure of the device to air substantially free of $SO_2$ the electrode current returned to the background value. Repeated tests showed the effect to be reproducible and to be substantially independent of, and not subject to interference by, the presence of other gaseous contaminants in the atmosphere; thus the presence of 50 v.p.m. of each of CO, $NO_2$ and $O_3$ did not change the current.

(B) Example 1(A) was repeated except that the liquid was an aqueous solution containing $CuCl_2$ at 0.05 M concentration, NaCl at 0.3 M concentration and HCl at 0.1 M concentration. The voltage was maintained at 330 mv. with the center electrode being the anode, and 1 megohm resistor 29 was used. After 2 hours of operating the device in room air (of very low $SO_2$ content) the background current was $6 \times 10^{-9}$ ampere. The device was then exposed successively to air containing increasing amounts of $SO_2$, the concentration of $SO_2$ being increased stepwise over the range of up to 6 v.p.m. $SO_2$. The current response was substantially linearly proportional to the $SO_2$ concentration (about $1.2 \times 10^{-8}$ ampere per v.p.m. $SO_2$). The response time was below 1 minute, the effect was reproducible, and reversible and was not interfered with by the presence of 50 v.p.m. CO, $NO_2$ or $O_3$.

(C) Example 1(B) was repeated using a higher cupric chloride concentration (0.5 M) with similar results. The speed of the reactions in Examples 1(B) and 1(C) is apparently so rapid that the rate-determining factor is not the concentration of the redox system but the permeability of the membrane.

EXAMPLE 2

This example deals with the measurement of nitrogen dioxide concentrations in air. The procedure of Example 1 was repeated, using as the liquid an aqueous solution containing KI at 0.05 M concentration and dibasic sodium phosphate buffer at 0.050 M concentration which is then adjusted (with $H_2SO_4$) to pH 7.4. The device was tested at various concentrations of $NO_2$ in air over the range of about 0 to 40 v.p.m. The voltage between the electrodes was 190 mv.; the center electrode was the cathode, and a 1 megohm resistor 29 was used. The background current in air was about $5 \times 10^{-9}$ and the substantially linear response was about $1.2 \times 10^{-9}$ ampere per v.p.m. of $NO_2$. The response time was below 3 minutes and the device behaved reversibly and reproducibly. The presence of 50 v.p.m. of each of CO, $SO_2$ and $O_3$ did not change the current.

EXAMPLE 3

(A) This example deals with the measurement of carbon monoxide. Example 1 was repeated, using as the liquid an aqueous solution containing HCl at 0.1 M concentration saturated with $PdCl_2$ at room temperature. The voltage between the electrodes was 400 mv. and the center electrode was the anode. A 1 megohm resistor 29 was used. In the tests of the device at various concentrations of CO in air over the range of about 0 to 80 v.p.m. the background current was $4.8 \times 10^{-8}$ ampere and the substantially linear response was about $2 \times 10^{-10}$ ampere per v.p.m. of CO. The device behaved reversibly and reproducibly. The presence of 50 v.p.m. of each of $SO_2$, $O_3$ and $NO_2$ did not change the current.

(B) Example 3(A) was repeated using as the liquid an aqueous solution containing HCl at 0.01 M concentration, $CuCl_2$ at 0.05 M concentration, saturated with $PdCl_2$ at room temperature. The voltage between the electrodes was 350 mv. with the center electrode being the anode. A 1 megohm resistor was used. After 1 hour of operation the background current was $1.8 \times 10^{-8}$ ampere. In tests at various concentrations of CO in air over the range of 0 to 60 v.p.m. CO, the response was linear (about $8 \times 10^{-10}$ ampere for v.p.m. CO). The response time was less than 4 min. The presence of $NO_2$ or $O_3$ did not interfere with the response. Repetition of this Example 3(B) using a lower acid concentration (i.e. at pH 5.1) gave similar results. Interference from the presence of $SO_2$ in the air can be avoided by removing the $SO_2$ from the air before testing, as by passing the air through a well-known alkaline filter.

EXAMPLE 4

This example deals with the measurement of ammonia. Example 1 was repeated using as the liquid an aqueous solution containing NaOBr at 0.06 M concentration and $NaHCO_3$ at 0.15 M concentration; the latter served as a buffer to keep the pH at about 8 to 9. The voltage between the electrodes was 300 mv. and the center electrode was the anode. A 0.5 megohm resistor 29 was used. In the tests of the device in various concentrations of $NH_3$ in air over the range of about 0 to 300 v.p.m., the background current was $1.5 \times 10^{-7}$ ampere (which may be due in part to a possible reaction of the nylon spacer with the liquid) and the substantially linear response was about $1.5 \times 10^{-10}$ amp per v.p.m. $NH_3$. The response time was about one minute and the device behaved reversibly and reproducibly.

EXAMPLE 5

This example deals with the measurement of ozone. Example 1 was repeated using as the liquid an aqueous solution containing KI at a 0.5 M concentration, $(NH_4)_6Mo_7O_{24}$ at a 0.05 M concentration, and dibasic sodium phosphate at a 0.050 M concentration adjusted to pH 7.4 with $H_2SO_4$. The voltage between the electrodes was 300 mv. and the center electrode was the cathode. A 1 megohm resistor 29 was used. In the tests the background current was $5 \times 10^{-8}$ amp. The device was exposed to ozone-containing air produced by a 4 watt ozone lamp and was found to give a current directly proportional to the amount of ozone in the air; the response time was less than two minutes. The results were reversible and reproducible.

EXAMPLE 6

This example deals with the measurement of the ethanol content of liquid water. Example 1 was repeated using as the liquid in contact with the electrodes an aqueous solution containing $H_2SO_4$ at 1 M concentration and $K_2Cr_2O_7$ at 0.2 M concentration. The voltage between the electrodes was 300 mv. and the center electrode was the anode. A 0.5 megohm resistor was used. The device was operated while dipping into a sample which was in turn supported in a boiling water bath (i.e. at 100° C.). When the membrane was in contact with distilled water the background current was $10^{-7}$ amp (which may be due in part to a possible reaction of the nylon spacer with the electrode liquid). The presence of 0.1% by volume of ethanol in the water in contact with the membrane raised the current by $2 \times 10^{-8}$ amp. The response time was less than one minute and the results were reversible and reproducible.

A membrane more resistant to bichromate (e.g. a permeable membrane of polytetrafluorethylene) may be used.

In the foregoing examples background currents have been specified. It will be understood, as previously discussed, that during long term operation these background currents will generally fall to much lower levels (typically to 10% or 1% of the values given), and also that by careful selection of the materials used and control of the purity of the initial electrode liquid lower background currents can be obtained. Still lower background currents can be attained by the use of a third electrode, as in the following example.

EXAMPLE 7

In this example there was used a third electrode (or "guard electrode") as described previously. The central circular platinum electrode had (as in Ex. 1) a diameter of 7 mm. The circular Teflon sleeve serving as spacer 29 had an outer diameter of 9 mm. The third electrode was an annular circular ring of 11 mm. in diameter (and therefore 1 mm. in thickness) around the Teflon sleeve and it was covered except at its exposed edge with insulating tubing 14 mm. in outside diameter (and therefore 1.5 mm. in thickness). Over the exposed lower face of this assembly a spacer layer of knit nylon hosiery material (as in Ex. 1) was placed, to space the center and guard electrodes from the membrane of the device. This whole assembly was placed in a cylindrical glass outer tube whose internal diameter was 18 mm. and across the bottom of which the membrane (as in Ex. 1) had been stretched. When the liquid of Example 1(A) was used, it was found that after 3 days the background current of the three electrode device was only 35% of the background current, also after 3 days, of the device described in Example 1.

EXAMPLE 8

This example deals with the measurement of hydrogen peroxide in water or other aqueous medium. Example 1 is repeated using as the liquid an aqueous solution containing KI at 0.1 M concentration, $(NH_4)_6Mo_7O_{24}$ at 0.01 M concentration and dibasic sodium phosphate at a 0.015 M concentration adjusted to pH 7.0 with sulfuric acid. The voltage between the electrodes was 175 mv. and the center electrode was the cathode. A 1 megohm resistor 29 was used. In tests with varying amounts of $H_2O_2$ in water, a substantially linear response of $1.6 \times 10^{-10}$ ampere per p.p.m. of $H_2O_2$ (by weight) was observed. The results were reversible and reproducible.

Cells made in accordance with this invention have been found to respond rapidly to changes in the concentration of the selected component to be measured and in such response, to give a current which reaches a steady value in a short time (e.g. less than 5 minutes, often less than 1 minute). This response has been observed with systems in which, I believe, the rate-determining factor is the rate of diffusion of the selected component through the membrane into layer of the electrode liquid, where the conversion reaction (with the redox system) is very rapid relative to the diffusion rate. A similar response also has been observed with systems in which the rate-determining factor is the rate of the conversion reaction itself; for instance, where the redox system is one which reacts with the selected component at a rate which is slow relative to the rate of diffusion through the membrane and the selected component is therefore probably present in the electrode liquid in a concentration corresponding to an activity similar to its activity in the mixture to be measured. The electrode reaction is usually fast as compared to the diffusion rate and conversion rate, but it is within the broad scope of this invention to use systems in which the rate of the electrode reaction is the rate-determining factor. The optimum thickness of the layer of electrode liquid depends on the relative rates of the various processes involved and the concentrations of the redox system in that layer; for example if the conversion reaction rate is the rate-determining factor a somewhat thicker layer of electrode liquid will provide more of the redox system and therefore a higher current.

In the cell for detecting $SO_2$ one may write the conversion reaction in two parts, e.g.:

$$SO_2 + 2H_2O - 2e \rightarrow SO_4^= + 4H^+$$

and 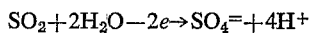. The redox potential of the second of these reactions is sufficiently positive to accept the electrons from the first reaction; that is, the redox potential of the second reaction is more positive than the redox potential of the first. The standard potential for the first of these reactions (oxidation of $SO_2$) is about $+0.17$ v.; in the dilute solutions illustrated here and at the low $SO_2$ pressures measured, the potential for the oxidation of $SO_2$ is around $+0.3$ v. The standard potential of the second reaction is $+0.77$ v. and in the absence of appreciable amounts of $Fe^{++}$ ions its potential is about $+1$ v.; it is, however, much lower than the potential needed for any appreciable oxidation of water (which is about $+1.8$ v. in acid medium).

In the foregoing discussion of specific redox potentials, and in the similar discussion below, the values for the standard potentials are taken from W. M. Latimer, "Oxidation Potentials," published by Prentice-Hall, 1952. The probable existing potentials can be calculated with the aid of the Nernst equation.

In the cell for detecting $NO_2$, the two partial conversion reactions are $N_2O_4 + 4H^+ + 4e \rightarrow 2NO + 2H_2O$ (writing $NO_2$ as its dimeric form, $N_2O_4$, in accordance with the view expressed in the Latimer book, previously cited) and $4I^- - 4e \rightarrow 2I_2$. The redox potential of the second of these reactions is sufficiently negative to supply the electrons for the first reaction; that is, the redox potential of the second reaction is more negative than the redox potential of the first. The standard potential for the first of these reactions (reduction of $NO_2$) is about $+1.03$ v.; in the dilute solutions illustrated here and at the low $NO_2$ pressures measured the potential for the reduction of $NO_2$ is about $+0.9$ v. The standard potential of the second reaction is about $+0.54$ v. and in the absence of appreciable amounts of $I_2$ its potential is about $+0.2$ v.; it is, however, much more positive than the potential needed for any appreciable reduction of water which is about $-0.8$ v. in neutral medium.

In the cell for detecting CO one may write the conversion reaction in two parts, e.g.:

$$CO + H_2O - 2e \rightarrow CO_2 + 2H^+$$

and

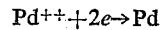

The redox potential of the second of these reactions is sufficiently positive to accept the electrons from the first reaction; that is, the redox potential of the second reaction is more positive than the redox potential of the first.

The standard potential for the first of these reactions (oxidation of CO) is about $-0.1$ v.; in the dilute solutions illustrated here and at the low CO pressures measured, the potential for the oxidation of CO is around $+0.1$ v. The potential of the $Pd^{++} \rightarrow Pd$ reaction (whose standard potential is about $+0.99$ v.) is, considerably lower than the potential needed for any appreciable oxidation of water.

In the cell for detecting $O_3$ one may write the conversion reaction in two parts:

$$O_3 + 2H^+ + 2e \rightarrow O_2 + H_2O$$
$$2I^- - 2e \rightarrow I_2$$

The redox potential of the second of these reactions is sufficiently negative (as pointed out in the previous discussion of the iodide-iodine reaction) to supply the electrons for the first reaction (whose standard potential is $+2.07$, and whose actual potential is in the neighborhood of $+1.85$) and, in the presence of the catalyst (such as the molybdate), the reactions proceed at a sufficiently rapid rate to give a quick response and a steady response current (after the initial response time of, say, about 2 minutes or less).

In the cell for detecting hydrogen peroxide one may write the conversion reaction in two parts:

$$H_2O_2 + 2H^+ + 2e \rightarrow 2H_2O$$
$$2I^- - 2e \rightarrow I_2$$

The redox potential of the iodide-iodine reaction (previously discussed) is sufficiently negative to supply the electrons for the first reaction (whose standard potential is $+1.35$ and whose actual potential is in the neighborhood of $+1.1$) and, in the presence of the catalyst (such as the molybdate) the reactions proceed at a sufficiently rapid rate to give a quick response and a steady response current.

While the invention has been illustrated for the measurement of $SO_2$, $O_3$, $NO_2$, $H_2O_2$, CO and $C_2H_5OH$ it will be understood that its principles may also be employed in the measurement of other species which can diffuse into the thin layer of electrolyte (preferably species which can diffuse through a membrane in contact with that layer) and which enter into a redox reaction with the redox system in the layer. For instance other nitrogen oxides besides $NO_2$ may be detected and measured.

It will also be understood that the ions of the redox systems described above may be in their simple or complex or compound form (e.g., as illustrated, hexavalent chromium may be present as bichromate ion, etc.).

As is conventional in this art, the meter or other readout device (e.g. the meter 31 and/or the recorder 64) is marked to indicate the concentration of the particular species being measured (e.g. $SO_2$, $NO_2$, $NH_3$, $O_3$, CO, ethanol, $H_2O_2$, etc.) directly rather than merely in amperes or other electrical units which must be converted to concentration of that species by means of a calibration table (just as the readout device of a conventional pH meter has indicia giving the pH reading directly and the readout devices of the commercial ozone meters have indicia giving ozone concentrations, in say p.p.m. or p.p.h.m. [parts per hundred million] directly). In FIG. 6 the scale 101 of meter 31 having needle 102 is marked to be conveniently readable in p.p.m. $SO_2$ (p.p.m. is the commonly used term for parts per million which may mean parts in terms of weight, volume, or moles; the term "v.p.m.," meaning volume parts per million is more precise, but less often used). A typical scale may run from 0 to 1 p.p.m. with linear scaling since the current output of the sensor is linearly related to the concentration. Such meter can also have a "multirange" scale (also shown in FIG. 6), the switching from one scale to another being effected by the use of a circuit as shown in FIG. 6, with the resistances of resistors 80 and 81 being in the ratio of 1:5, the higher resistance corresponding to the more sensitive scale (0–1 p.p.m.). Another common means of utilizing one meter for several ranges is to use one scale and to provide the knob 105 which controls the step switch 84 (switching between resistors 80 and 81) with indicia showing the multiplication factor, as also shown in FIG. 6. As is conventional, the meter 31 has two controls for calibration: (a) an offset control (of well-known construction, not shown) which permits one to set the meter to zero p.p.m. (when the sensor in contact with an environment containing none of the species to be measured or containing a pre-determined base-line concentration of that species) even though a small background current, previously discussed, may be flowing; and (b) a gain control, of the continuously variable type, (also of well-known construction, not shown) which is used to adjust the meter reading to any value on the scale when the sensor is, during calibration, in contact with a known concentration (above the zero or base-line concentration) of that species. In addition to the continuously variable gain control, there may be a stepwise gain control (e.g. the arrangement of resistors 80, 81, 82, 83 and switch 84, in FIG. 6).

A preferred electrode structure, of which one embodiment is described below is made by applying a thin coating of decomposable platinum compound (e.g. a platinum salt) onto a glass surface and then decomposing the platinum compound, as by heating, to form a thin layer of metallic platinum, whose thickness is less than 0.1 mm. usually of such thickness as to be translucent. Preferably there is a narrow unplatinized zone (or "rim") around the periphery of the platinized glass surface; this may be produced by applying the platinum to only the central portion of that face or by applying it over the whole face and abrading off the edge portions of the platinum. This rim serves as a spacer with respect to the solution, insuring that the electrode is effected predominantly by substances (e.g. $SO_2$) entering the liquid at the electrode surface through the membrane rather than substances entering from around the edges of the electrode. Electrodes of this type are suitable not only for cells containing redox systems but are of general utility for electrochemical analysis. They are convenient, inexpensive and reliable and give a high stable current response in the species to be measured.

In a preferred form the electrode was constructed by heat-sealing a short piece of platinum wire 22 in the lower end of a piece of glass tubing which served as the rod 11. The outer diameter of the glass tube was 7 mm. The glass at the closed, sealed end of the tubing was then ground plane retaining the diameter of 7 mm. and a solution containing $PtCl_4$ in acetone (e.g. 0.1 g. $PtCl_4$ per ml. of acetone) was applied to most of that ground end, being applied as a concentric disc of 5 mm. diameter on to the ground end, which was then exposed to moderate heat over a conventional Bunsen burner to decompose the platinum compound, forming a thin layer of metallic platinum. The resulting electrode was then brought to red heat over the Bunsen burner to insure good adhesion of the platinum to the glass. The resulting thin circular platinum electrode had a diameter of 5 mm. Then unplatinized glass rim of about 1 mm. width served as spacer with respect to the solution. A piece of thin ordinary knit sheer nylon ladies hosiery material (e.g. knit 45 denier nylon), serving as the spacer 16, was then fixed over the electrode and was held on the rod (e.g. by a rubber band or other holding device). The resulting assembly was then placed in the cylindrical glass outer tube 19 (whose inner diameter was 9 mm.) with the assembly pressed lightly against the membrane 14 at the bottom of the platinum electrode; the distance between the electrode and the membrane was determined by the thickness of the knit nylon spacer 16 which was about 0.04 mm. The membrane 14 was of silicone rubber (supplied by General Electric Co.) about 0.025 mm. in thickness. The membrane was held taut across the bottom of the outer tube 19 by suitable holding device such as a band. Suitable spacers may be present to help support and center the rod and the electrode 12 carried thereby, within the outer casing. The counter electrode was a platinum wire of 0.6 mm. diameter which was wrapped five times around the 7 mm. glass tubing about 10 mm. above the platinized end of the glass tubing.

It is understood that the foregoing detailed description is given merely by way of illustration and that variations may be made therein without departing from the spirit of the invention. The "abstract" given above is merely for the convenience of technical searchers and is not to be given any weight with respect to the scope of the invention.

What is claimed is:

1. A process for determining the amount of $SO_2$ in a mixture, comprising the steps of:
providing a cell having a first electrode with an electrolyte layer on said first electrode, and a second electrode, said electrolyte layer containing an ionic redox system in a first state of oxidation,
reacting $SO_2$ from said mixture with said redox system by exposing said electrolyte layer to said mixture to form an electroactive species in a second state of oxidation,
applying a voltage across said electrodes,
reconverting by electron transfer said electroactive species to said first state of oxidation, and
measuring the current passing through said first electrode.

2. The process of claim 1, including the step of providing a membrane permeable to $SO_2$, between said electrodes and said mixture, wherein said electrolyte layer is exposed to said mixture through said membrane.

3. The process of claim 1, in which said redox system is comprised of cupric copper.

4. The process of claim 1, in which said redox system is comprised of ferric ion.

5. The process of claim 1, where said redox system is comprised of a varivalent metal ion.

6. A process for determining the amount of CO in a mixture, comprising the steps of:
providing a cell having a first electrode with an electrolyte layer on said first electrode, and a second electrode, said electrolyte layer containing an ionic redox system in a first state of oxidation,
reacting CO from said mixture with said redox system by exposing said electrolyte layer to said mixture to form an electroactive species in a second state of oxidation,
applying a voltage across said electrodes,
reconverting by electron transfer said electroactive species to said first state of oxidation, and
measuring the current passing through said first electrode.

7. The process of claim 6, including the step of providing a membrane permeable to CO, between said electrodes and said mixture, wherein said electrolyte layer is exposed to said mixture through said membrane.

8. The process of claim 6, where said electrolyte layer is comprised of palladium in palladous state.

9. A process for determining the amount of $NH_3$ in a mixture, comprising the steps of:
providing a cell having a first electrode with an electrolyte layer on said first electrode, and a second electrode, said electrolyte layer containing an ionic redox system in a first state of oxidation,
reacting $NH_3$ from said mixture with said redox system by exposing said electrolyte layer to said mixture to form an electroactive species in a second state of oxidation,
applying a voltage across said electrodes,
reconverting by electron transfer said electroactive species to said first state of oxidation, and
measuring the current passing through said first electrode.

10. The process of claim 9, including the step of providing a membrane permeable to $NH_3$, between said electrodes and said mixture, wherein said electrolyte layer is exposed to said mixture through said membrane.

11. The process of claim 9, where said redox system is comprised of oxybromide.

12. A process for determining the amount of ethanol in a mixture, comprising the steps of:
providing a cell having a first electrode with an electrolyte layer on said first electrode, and a second electrode, said electrolyte layer containing an ionic redox system in a first state of oxidation.
reacting ethanol from said mixture with said redox system by exposing said electrolyte layer to said mixture to form an electroactive species in a second state of oxidation,
applying a voltage across said electrodes,
reconverting by electron transfer said electroactive species to said first state of oxidation, and
measuring the current passing through said first electrode.

13. The process of claim 12, including the step of providing a membrane permeable to ethanol, between said electrodes and said mixture, wherein said electrolyte layer is exposed to said mixture through said membrane.

14. The process of claim 12, in which said redox system is comprised of hexavalent chromium.

15. The process of claim 6, in which said electrolyte contains a plurality of coacting redox agents including a first redox agent which changes from its original oxidation state to a different state of oxidation on reaction with said CO and another redox agent which reacts with said first redox agent in said different state of oxidation to return said first redox agent to said original oxidation state.

16. The process of claim 6, in which said electrolyte is comprised of cupric copper.

17. The process of claim 1, where said $SO_2$ and said redox system react at said first electrode.

References Cited
UNITED STATES PATENTS

| | | | |
|---|---|---|---|
| 3,088,905 | 5/1963 | Glover | 204—195 P |
| 3,227,643 | 1/1966 | Okun et al. | 204—195 P |
| 3,380,905 | 4/1968 | Clark | 204—195 P |
| 3,539,455 | 11/1970 | Clark | 204—1 T |

TA-HSUNG TUNG, Primary Examiner

U.S. Cl. X.R.

204—195 R, 195 P